US009442616B2

(12) United States Patent
Imamura et al.

(10) Patent No.: US 9,442,616 B2
(45) Date of Patent: Sep. 13, 2016

(54) TOUCH SCREEN, TOUCH PANEL, AND DISPLAY DEVICE EQUIPPED THEREWITH

(71) Applicant: Mitsubishi Electric Corporation, Tokyo (JP)

(72) Inventors: Takuji Imamura, Tokyo (JP); Takeshi Ono, Tokyo (JP); Tatsuya Nakamura, Tokyo (JP); Tae Orita, Tokyo (JP); Masafumi Agari, Tokyo (JP); Naoki Nakagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/503,837

(22) Filed: Oct. 1, 2014

(65) Prior Publication Data

US 2015/0116262 A1  Apr. 30, 2015

(30) Foreign Application Priority Data

Oct. 24, 2013 (JP) ................................. 2013-221001

(51) Int. Cl.
*G06F 3/045* (2006.01)
*G06F 3/044* (2006.01)
*G06F 3/041* (2006.01)

(52) U.S. Cl.
CPC ............. *G06F 3/044* (2013.01); *G06F 3/0416* (2013.01)

(58) Field of Classification Search
CPC ...................... G06F 3/044; G06F 2203/04111; G06F 3/041; G06F 2203/04112; G06F 3/0418; H01L 27/14601; H01L 27/14603
USPC ...................... 345/173–178; 178/18.01–20.04
See application file for complete search history.

(56) References Cited

U.S. PATENT DOCUMENTS

| 5,844,506 | A | 12/1998 | Binstead |
| 6,137,427 | A | 10/2000 | Binstead |
| 6,384,396 | B1* | 5/2002 | Mizuno ............. H01L 27/14601 250/208.1 |
| RE40,867 | E | 8/2009 | Binstead |
| 8,269,744 | B2 | 9/2012 | Agari et al. |
| 8,390,598 | B2 | 3/2013 | Agari et al. |
| 2009/0084611 | A1* | 4/2009 | Liao ........................ G06F 3/041 178/18.03 |
| 2010/0060602 | A1* | 3/2010 | Agari ...................... G06F 3/044 345/173 |
| 2011/0298746 | A1* | 12/2011 | Hotelling ................ G06F 3/044 345/174 |
| 2013/0082964 | A1 | 4/2013 | Agari et al. |
| 2013/0194232 | A1 | 8/2013 | Imamura et al. |

FOREIGN PATENT DOCUMENTS

| JP | H09-511086 A | 11/1997 |
| JP | 2010-061502 A | 3/2010 |

(Continued)

*Primary Examiner* — Kent Chang
*Assistant Examiner* — Gerald Oliver
(74) *Attorney, Agent, or Firm* — Studebaker & Brackett PC (57) ABSTRACT

In an intersecting region of a bundle of wirings in a column direction and a bundle of wirings in a row direction, a column wiring block region arranged with detection column wirings and first floating wirings and a row wiring block region arranged with detection row wirings and second floating wirings are disposed in a staggered manner. The bundle of wirings in the column direction includes a first compensation region arranged with the detection column wirings which connect between the detection column wirings in the column wiring block regions adjacent to each other in a diagonal direction. The bundle of wirings in the row direction includes a second compensation region arranged with the detection row wirings which electrically connect between the detection row wirings in the row wiring block regions adjacent to each other in a diagonal direction.

9 Claims, 7 Drawing Sheets

(56) References Cited

FOREIGN PATENT DOCUMENTS

| | | |
|---|---|---|
| JP | 2010-097536 A | 4/2010 |
| JP | 2013-080328 A | 5/2013 |
| JP | 2013-161128 A | 8/2013 |
| WO | 95/27334 A1 | 10/1995 |

* cited by examiner

⊗ DETECTION COLUMN WIRING
⊗ DETECTION ROW WIRING
○ FIRST FLOATING WIRING
◇ SECOND FLOATING WIRING

TOUCH SCREEN, TOUCH PANEL, AND DISPLAY DEVICE EQUIPPED THEREWITH

BACKGROUND OF THE INVENTION

1. Field of the Invention

The present invention relates to a touch screen, a touch panel, and a display device equipped therewith.

2. Description of the Background Art

A touch panel detecting a touch by a pointing body, such as a finger, and specifying coordinates of the touch position has attracted attention as one of excellent interface means. Currently, touch panels of various types, such as a resistance film type or an electrostatic capacitance type, have been produced.

As one form of the electrostatic capacitance type touch panel, there is a Projected Capacitive type touch panel disclosed in Japanese Unexamined Patent Application Publication (Translation of PCT Application) No. 9-511086 (1997) (referred to as "JP 9-511086 (1997) W" hereinafter), Japanese Patent Application Laid-Open No. 2010-61502 (referred to as "JP 2010-61502 A" hereinafter), Japanese Patent Application Laid-Open No. 2010-97536 (referred to as "JP 2010-97536 A" hereinafter), and Japanese Patent Application Laid-Open No. 2013-80328 (referred to as "JP 2013-80328 A" hereinafter), for example. Even if a protective plate formed of a glass plate or the like with a thickness of about several millimeters is provided on a front surface side of a touch screen incorporating a touch sensor, the Projected Capacitive type touch panel is capable of detecting a touch. The touch panel has advantages in that rigidity is excellent, the touch can be detected even at the time of wearing gloves, and a life is long since a movable part does not exist, and the like.

A touch screen configuring the touch panel disclosed in JP 9-511086 (1997) W includes, as detection wirings (detection electrodes) for detecting electrostatic capacitance, a first series of conductor elements formed of a thin conductive film and a second series of conductor elements formed on the first series of conductor elements via an insulation film. There is no electrical contact between the respective conductor elements, and a plurality of intersection points are formed. In the touch panel of JP 9-511086 (1997) W, coordinates of a position touched by a pointing body, such as a finger, is specified by detecting the electrostatic capacitance formed between the pointing body and the conductor elements. Further, the touch position between the conductor elements can be compensated using a relative value of capacitance detected by the one or more conductor elements.

In a touch screen configuring a touch panel disclosed in JP 2010-61502 A, each detection column wiring extending in a column direction is formed of a metal wiring in a zigzag pattern having inclined portions inclined at 45° with respect to a column direction, and each detection row wiring extending in a row direction is formed of a metal wiring in a zigzag pattern having inclined portions inclined at 45° with respect to a row direction. According to the touch screen in JP 2010-61502 A, a wiring density is increased without increasing parasitic capacitance between the detection wirings, and detection sensitivity of a touch can be improved.

As in the touch screen in JP 2010-61502 A, a touch screen configuring a touch panel disclosed in JP 2010-97536 A includes detection column wirings and detection row wirings formed in zigzag patterns, and is further configured by providing an isolated wiring electrically insulated from the detection column wirings and the detection row wirings in a region enclosed thereby.

A touch screen configuring a touch panel disclosed in JP 2013-80328 A has a configuration in which a region where a bundle of wirings in a column direction, which is a bundle of a plurality of detection column wirings, and a bundle of wirings in a row direction, which is a bundle of a plurality of detection row wirings, intersect with each other is divided into a block region (column wiring block region) arranged only with the detection column wirings and a block region (row wiring block region) arranged only with the detection row wirings. According to this configuration, since an area where the detection column wirings and the detection row wirings overlap is made small and parasitic capacitance (inter-wiring capacitance) formed between the detection column wirings and the detection row wirings is reduced, detection sensitivity of a touch can be enhanced. Further, even in the case where the detection column wirings and the detection row wirings are formed of an opaque highly conductive material, transmittance of display light incident on the touch screen from a display panel can be made uniform, and occurrence of moire fringes on the screen of the touch panel can be suppressed.

In each touch screen in JP 2010-61502 A and JP 2013-80328 A, the region where the bundle of wirings in the column direction and the bundle of wirings in the row direction intersect with each other is divided into the column wiring block region and the row wiring block region, and the column wiring block region and the row wiring block region are alternately arranged in the column direction and the row direction, thereby forming a checker pattern. In other words, the column wiring block regions and the row wiring block regions are respectively arranged in a staggered manner.

Since the detection column wirings and the detection row wirings are formed on mutually different wiring layers, for example, when there is a difference between a width of the detection column wiring and a width of the detection row wiring, a difference may be generated in the transmittance of the display light, reflectance of external light, and further, wavelength spectrums of transmitted light and reflected light. As a result, JP 2013-80328 A proposes that by replacing a part of the detection column wirings in the column wiring block region with floating wirings on the same layer as the detection row wirings, and further, by replacing a part of the detection row wirings in the row wiring block region with floating wirings on the same layer as the detection column wirings, a repetition frequency (number of repetitions) of a pattern is set high, thereby making it difficult to visually recognize moire fringes.

However, in the case where the column wiring block regions are arranged in the staggered manner, in order to electrically connect the detection column wirings in the column wiring block regions adjacent to each other in a diagonal direction, it is necessary to arrange the detection column wirings at four corners of each column wiring block region instead of the floating wirings. Likewise, in the case where the row wiring block regions are arranged in the staggered manner, in order to electrically connect the detection row wirings in the row wiring block regions adjacent to each other in a diagonal direction, it is necessary to arrange the detection row wirings at four corners of each row wiring block region instead of the floating wirings.

For example, when a pitch of a repetition pattern by the detection column wirings and the floating wirings in the column wiring block region is P, in order to arrange the detection column wirings at the four corners of the column wiring block region, a width of the column wiring block region needs to be P/2×(2N+1) (N is an integer). Likewise, when a pitch of a repetition pattern by the detection row wirings and the floating wirings in the row wiring block region is P, in order to arrange the detection row wirings at the four corners of the row wiring block region, a width of the row wiring block region needs to be P/2×(2N+1). As a result, a width of the bundle of wirings in the column direction and a width of the bundle of wirings in the row direction can be designed only at discrete values based on the pitch P of the repetition pattern, and these widths cannot be determined freely.

Therefore, in the touch screen having the column wiring block regions and the row wiring block regions forming the checker pattern, a size of a detection region (sensor region) of a touch cannot be determined freely, and it is difficult to adjust the size of the sensor region of the touch screen according to a screen size of the display panel.

SUMMARY OF THE INVENTION

An object of the present invention is to provide a touch screen with a high degree of freedom in designing a width of a bundle of wirings in a column direction and a width of a bundle of wirings in a row direction.

A touch screen according to the present invention includes a transparent substrate, a bundle of wirings in a column direction which is formed on the transparent substrate and includes a plurality of detection column wirings electrically connected in common, and a bundle of wirings in a row direction which includes a plurality of detection row wirings electrically connected in common. Further, the touch screen includes first floating wirings which are formed on a same wiring layer as the detection row wirings and are not connected with the detection column wirings and the detection row wirings, and second floating wirings which are formed on a same wiring layer as the detection column wirings and are not connected with the detection column wirings and the detection row wirings. In a region where the bundle of wirings in the column direction and the bundle of wirings in the row direction intersect with each other, a column wiring block region arranged with the detection column wirings configuring the bundle of wirings in the column direction and the first floating wirings and a row wiring block region arranged with the detection row wirings configuring the bundle of wirings in the row direction and the second floating wirings are disposed in a staggered manner. The bundle of wirings in the column direction includes a first compensation region arranged with the detection column wirings, which are disposed so as to electrically connect between the detection column wirings in the column wiring block regions adjacent to each other in a diagonal direction, and the first floating wirings. The bundle of wirings in the row direction includes a second compensation region arranged with the detection row wirings, which are disposed so as to electrically connect between the detection row wirings in the row wiring block regions adjacent to each other in a diagonal direction, and the second floating wirings.

By including the compensation regions in the bundle of wirings in the column direction and the bundle of wirings in the row direction, a degree of freedom in designing the widths of the bundle of wirings in the column direction and the bundle of wirings in the row direction is improved, and a size of a sensor region of the touch screen can be adjusted. Therefore, it becomes easier to adjust the size of the sensor region of the touch screen according to a screen size of a display panel.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
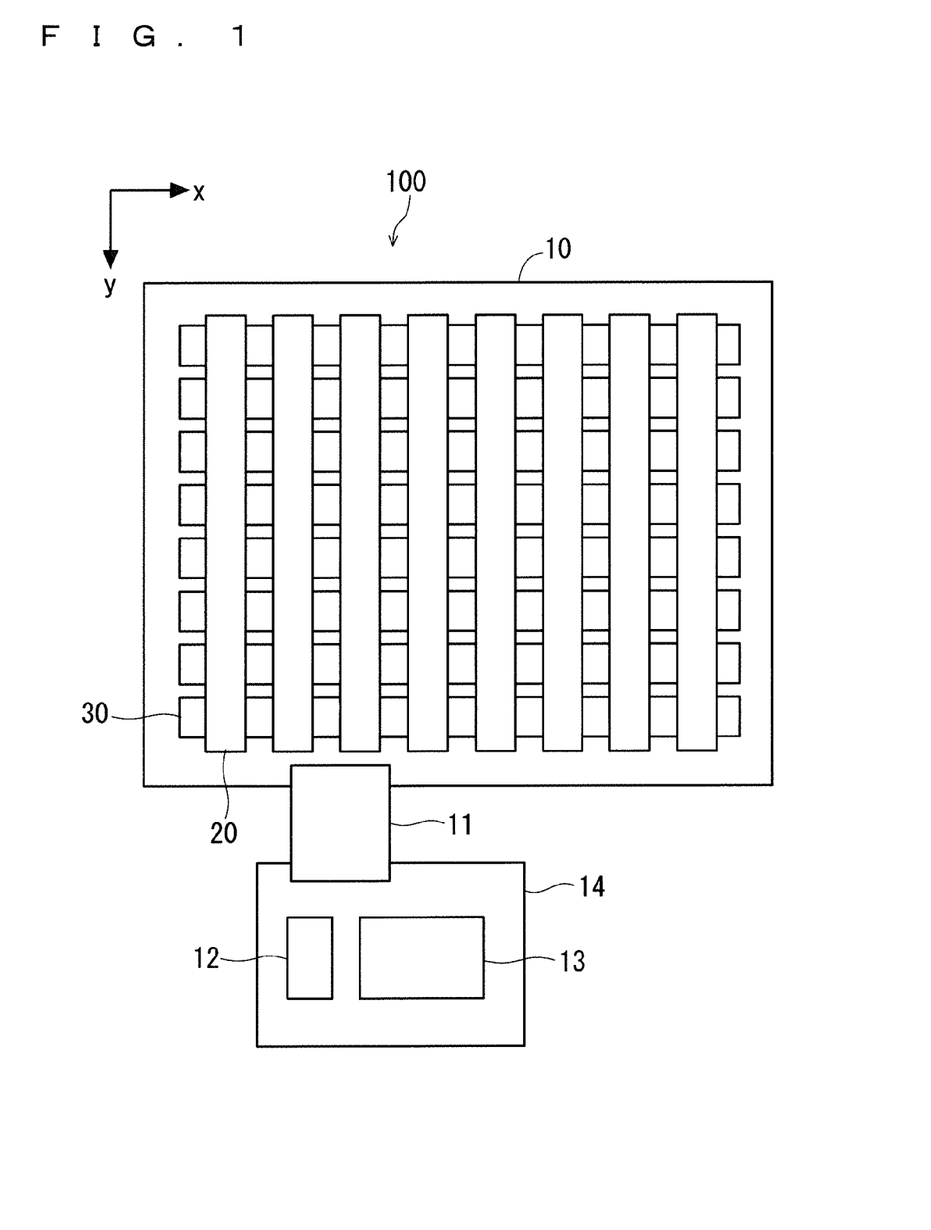
FIG. 1 is a diagram illustrating an entire configuration of a touch panel including a touch screen.

FIG. 1 is diagram exemplarily illustrating an entire configuration of a touch panel 100 including a touch screen 10 according to a preferred embodiment of the present invention. The touch panel 100 is configured by connecting a controller substrate 14, on which a switching circuit 12 and a detection processing circuit 13 are mounted, to the touch screen 10 via an FPC (Flexible Printed Circuit) 11. It should be noted that in the case where the touch panel 100 is built in a display device, the touch screen 10 is adhesively fixed to a front surface of a display panel of the display device.

In the touch screen 10, detection wiring groups (a bundle 20 of wirings in a column direction and a bundle 30 of wirings in a row direction) are arranged in a sensor region which detects a touch by a pointing body, such as a finger. The FPC 11 electrically connects these detection wiring groups to the switching circuit 12. Though illustration in FIG. 1 is omitted, the bundle 20 of wirings in the column direction is a bundle of a plurality of detection column wirings extending in a column direction (y direction), and the bundle 30 of wirings in the row direction is a bundle of a plurality of detection row wirings extending in a row direction (x direction).

The switching circuit 12 has a function of sequentially selecting each of the plurality of bundle 20 of wirings in the column direction and each of the plurality of bundle 30 of wirings in the row direction. The detection processing circuit 13 has a function of detecting touch coordinates in the touch screen 10 which indicate a touch position of the pointing body touching the touch screen 10.

Figure 2:
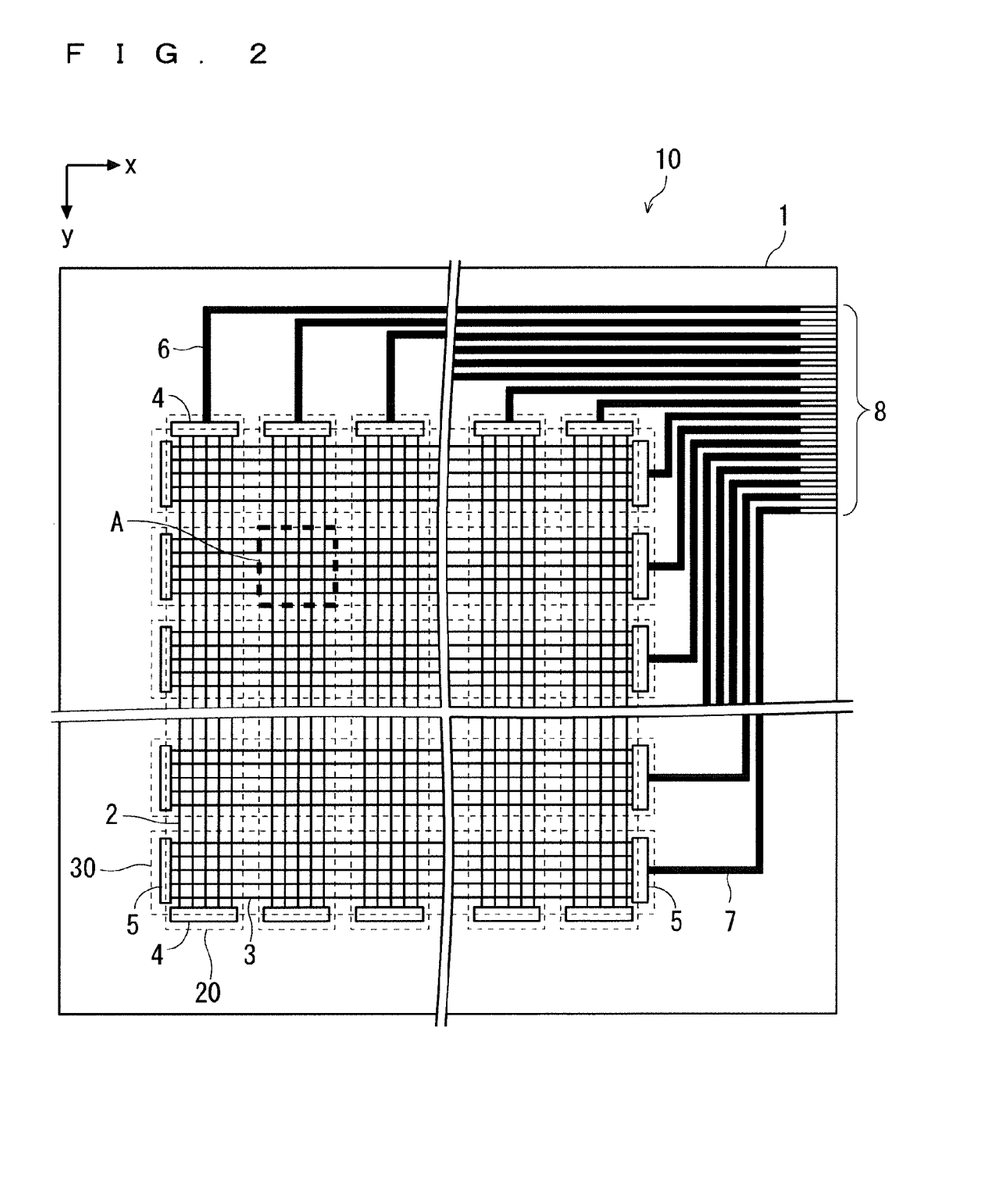
FIG. 2 is a plan view illustrating a configuration of the touch screen according to a preferred embodiment of the present invention.
Figure 3:
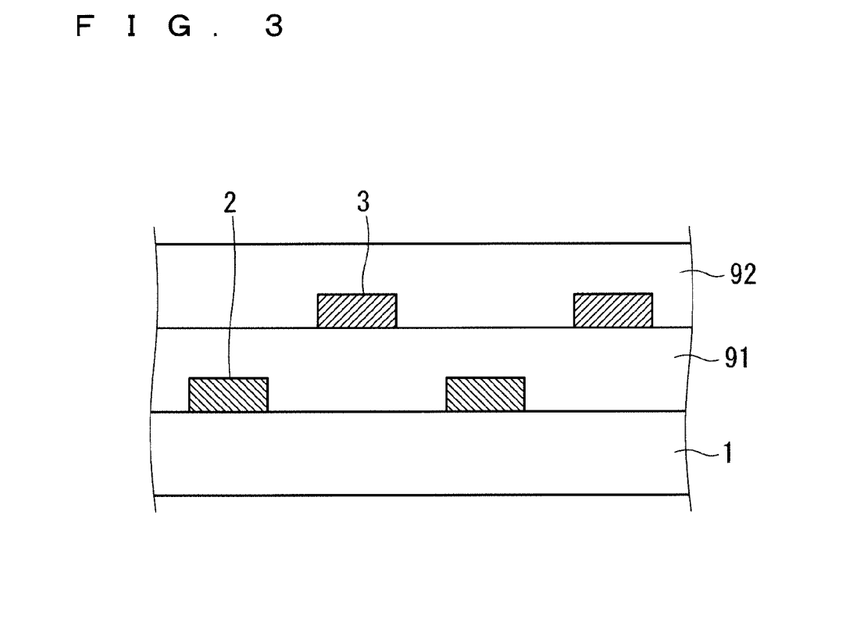
FIG. 3 is a cross-sectional view for explaining a wiring structure of the touch screen.
Figure 4:
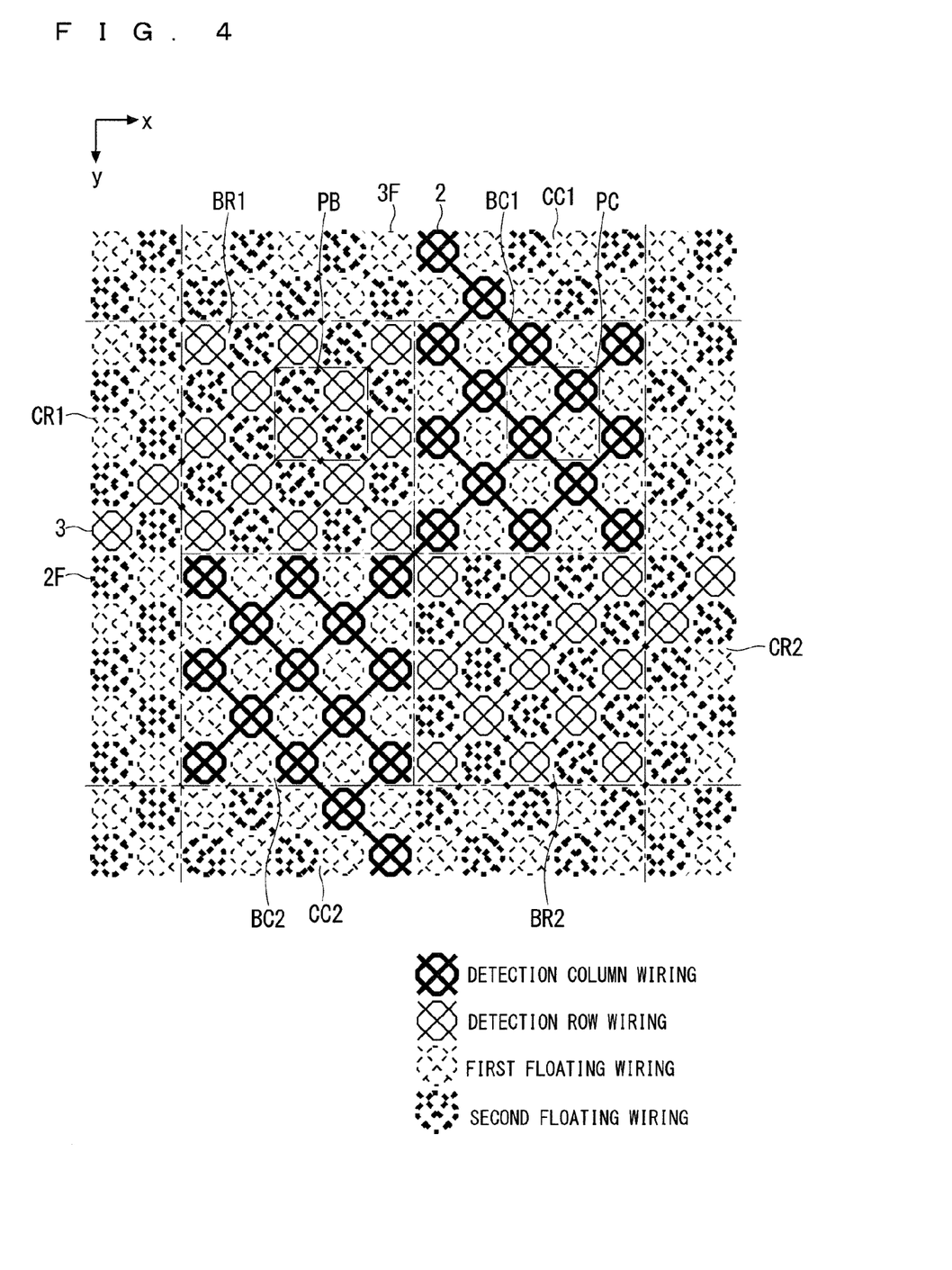
FIG. 4 is an enlarged plan view of a part of an intersecting region of a bundle of wirings in a column direction and a bundle of wirings in a row direction.

FIG. 2 is a plan view exemplarily illustrating a configuration of the touch screen 10. Further, FIG. 3 is a cross-sectional view illustrating a wiring structure of the touch screen 10. FIG. 4 is an enlarged plan view of a part of a region (region A in FIG. 2) where the bundle 20 of wirings in the column direction and the bundle 30 of wirings in the row direction intersect with each other.

The touch screen 10 has a configuration where the plurality of bundles 20 of wirings in the column direction extending in the column direction and the plurality of bundles 30 of wirings in the row direction extending in the row direction are arranged on a base substrate 1, which is a transparent substrate formed of a transparent glass material or a transparent resin, in such a manner that the plurality of bundles 20 of wirings in the column direction and the plurality of bundles 30 of wirings in the row direction intersect with each other.

Each bundle 20 of wirings in the column direction has a rectangular pattern formed of a plurality of detection column wirings 2. Detection column wirings 2 belonging to the same bundle 20 of wirings in the column direction are electrically connected in common by a connection wiring 4 or the like. Likewise, each bundle 30 of wirings in the row direction has a rectangular pattern formed of the plurality of detection row wirings 3. The detection row wirings 3 belonging to the same bundle 30 of wirings in the row direction are electrically connected in common by a connection wiring 5 or the like.

As illustrated in FIG. 3, the detection column wirings 2 configuring the bundle 20 of wirings in the column direction are formed on the base substrate 1. The detection column wirings 2 are covered with an insulation film 91, and the detection row wirings 3 are arranged on the insulation film 91. Accordingly, the detection column wirings 2 and the detection row wirings 3 are electrically separated. Further, the detection row wirings 3 are covered with an insulation film 92.

The bundle 20 of wirings in the column direction and the bundle 30 of wirings in the row direction are connected to terminals 8 provided at an end part of the base substrate 1 by lead-out wirings 6 and 7. The FPC 11 (FIG. 1) is connected to the terminals 8.

Here, a self-capacitance detection type and a mutual capacitance detection type are considered as a type of detecting touch coordinates of a pointing body in the touch panel 100. The self-capacitance detection type is a type of detecting touch coordinates by detecting electrostatic capacitance formed between each detection column wiring 2 and a pointing body and electrostatic capacitance formed between each detection row wiring 3 and the pointing body when the a surface of the base substrate 1 of the touch screen 10 is touched by the pointing body. The mutual capacitance detection type is a type of detecting touch coordinates by detecting a change of electrostatic capacitance (mutual capacitance) between the detection column wiring 2 and the detection row wiring 3 at a touch position which is generated when the surface of the base substrate 1 of the touch screen 10 is touched by the pointing body.

Accordingly, in the case of the touch panel 100 of the self-capacitance detection type, the detection processing circuit 13 illustrated in FIG. 1 becomes a circuit which detects the electrostatic capacitance formed between the bundle 20 of wirings in the column direction selected by the switching circuit 12 and the pointing body and the electrostatic capacitance formed between the bundle 30 of wirings in the row direction selected by the switching circuit 12 and the pointing body, and calculates the touch coordinates of the pointing body based on the detection results.

Further, in the case of the touch panel 100 of the mutual capacitance detection type, the detection processing circuit 13 becomes a circuit which detects the change of the electrostatic capacitance between the bundle 20 of wirings in the column direction and the bundle 30 of wirings in the row direction selected by the switching circuit 12, which has been generated by the touch of the pointing body to the touch screen 10, and calculates the touch coordinates of the pointing body based on the detection results.

A configuration of the bundle 20 of wirings in the column direction and the bundle 30 of wirings in the row direction in the present preferred embodiment will be described below in detail. As illustrated in FIG. 4, in an intersecting region of the bundle 20 of wirings in the column direction and the bundle 30 of wirings in the row direction, column wiring block regions BC1 and BC2 arranged with the detection column wirings 2 (thick solid lines) and row wiring block regions BR1 and BR2 arranged with the detection row wirings 3 (thin solid lines) are alternately disposed in the column direction (y direction) and the row direction (x direction), thereby forming a checker pattern. In other words, the row wiring block regions BR1 and BR2 and the column wiring block regions BC1 and BC2 are respectively arranged in a staggered manner. In FIG. 4, only the two column wiring block regions BC1 and BC2 and the two row wiring block regions BR1 and BR2 are illustrated. However, in the intersecting region between the bundle 20 of wirings in the column direction and the bundle 30 of wirings in the row direction, even more column wiring block regions and row wiring block regions are arranged (see FIGS. 6 and 7).

Parts of the detection column wirings 2 in the column wiring block regions BC1 and BC2 are replaced with first floating wirings 3F (narrow dotted lines) which are formed on the same wiring layer as the detection row wirings 3 and are not connected with the detection column wirings 2 and the detection row wirings 3. Further, parts of the detection row wirings 3 in the row wiring block regions BR1 and BR2 are replaced with second floating wirings 2F (thick dotted lines) which are formed on the same wiring layer as the detection column wirings 2 and are not connected with the detection column wirings 2 and the detection row wirings 3. With this configuration, a repetition frequency (number of repetitions) of a pattern is set high, thereby making it difficult to visually recognize the patterns of the detection column wirings 2 and the detection row wirings 3.

Figure 5A:
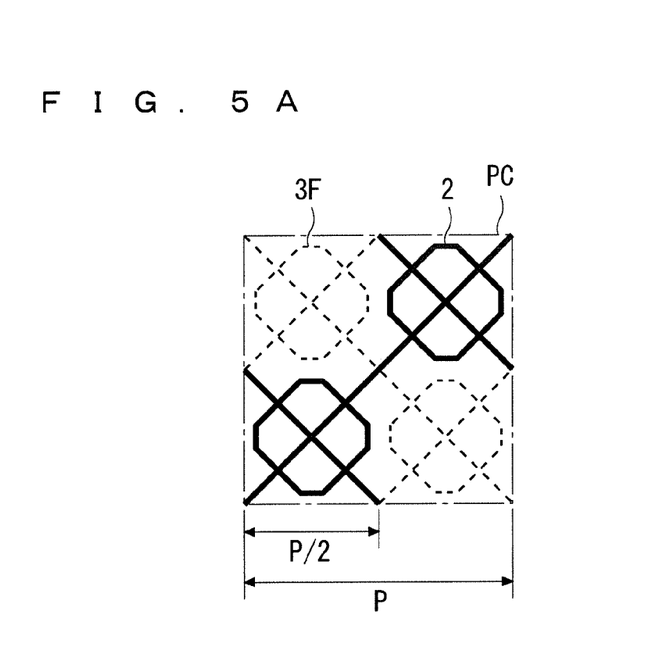
FIG. 5A is a diagram illustrating a repetition pattern configuring a column wiring block region.
Figure 5B:
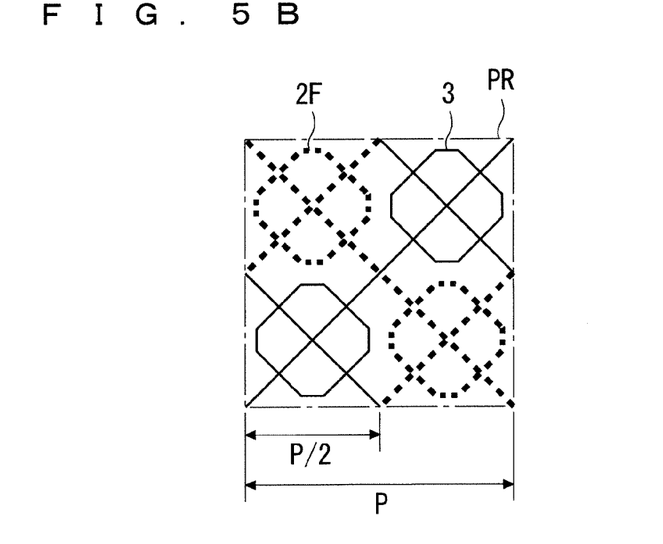
FIG. 5B is a diagram illustrating a repetition pattern configuring a row wiring block region.

FIG. 5A is a diagram illustrating a repetition pattern PC configuring the column wiring block regions BC1 and BC2, and FIG. 5B is a diagram illustrating a repetition pattern PR configuring the row wiring block regions BR1 and BR2. As illustrated in FIG. 5A, the repetition pattern PC is a pattern in which the detection column wirings 2 and the first floating wirings 3F are alternately arranged in the column direction and the row direction. As in FIG. 5B, the repetition pattern PR is a pattern in which the detection row wirings 3 and the second floating wirings 2F are alternately arranged in the column direction and the row direction. In this way, the repetition patterns PC and PR are patterns in which the wirings on the same layer as the detection column wirings 2 and the wirings on the same layer as the detection row wirings 3 are alternately arranged. Here, repetition pitches of the repetition patterns PC and PR are equal to each other, and values thereof are P.

It is necessary to extend the respective detection column wirings 2 configuring the bundle 20 of wirings in the column direction while maintaining electrical connection in the column direction. Because of this, in the case where the column wiring block regions BC1 and BC2 are arranged in a staggered manner, it is necessary to arrange the detection column wirings 2 at four corners of the column wiring block regions BC1 and BC2 instead of the first floating wirings 3F.

As a result, widths of the column wiring block regions BC1 and BC2 have to be P/2×(2N+1) (N is an integer).

Further, it is necessary to extend the respective detection row wirings 3 configuring the bundle 30 of wirings in the row direction while maintaining electrical connection in the row direction. Because of this, in the case where the row wiring block regions BR1 and BR2 are arranged in a staggered manner, it is necessary to arrange the detection row wirings 3 at four corners of the row wiring block regions BR1 and BR2 instead of the second floating wirings 2F. As a result, widths of the row wiring block regions BR1 and BR2 have to be P/2×(2N+1) (N is an integer). In the present preferred embodiment, compensation regions are arranged on one side or both sides of the column wiring block regions BC1 and BC2 and the row wiring block regions BR1 and BR2 in the column direction (the up and down direction in the plan view) and on one side or both sides thereof in the row direction (the right and left direction in the plan view) in such a manner that the compensation regions are adjacent to the column wiring block regions BC1 and BC2 and the row wiring block regions BR1 and BR2, which are alternately arrayed to form the checker pattern.

FIG. 4 illustrates an example in which a compensation region CC 1 is arranged on an upper side of the column wiring block regions BC1 and BC2 and the row wiring block regions BR1 and BR2, a compensation region CC2 is arranged on a lower side thereof, a compensation region CR1 is arranged on a left side thereof, and a compensation region CR2 is arranged on a right side thereof. The compensation regions CC1 and CC2 (first compensation regions) configure the bundle 20 of wirings in the column direction with the column wiring block regions BC1 and BC2, and are provided for maintaining the electrical connection of the detection column wirings 2 in the column direction. The compensation regions CR1 and CR2 (second compensation regions) configure the bundle 30 of wirings in the row direction with the row wiring block regions BR1 and BR2, and are provided for maintaining the electrical connection of the detection row wirings 3 in the row direction.

As in the same way as the repetition pattern PC in the column wiring block regions BC1 and BC2, and the repetition pattern PR in the row wiring block regions BR1 and BR2, the compensation regions CC1, CC2, CR1 and CR2 are each formed of a pattern in which the wirings on the same layer as the detection column wirings 2 and the wirings on the same layer as the detection row wirings 3 are alternately arranged at the repetition pitch P. As the repetition pattern configuring the compensation regions CC1, CC2, CR1, and CR2 has a similar configuration as the repetition pattern PC in the column wiring block regions BC1 and BC2, and the repetition pattern PR in the row wiring block regions BR1 and BR2, the repetition frequency of the pattern is maintained even in the compensation regions CC1, CC2, CR1 and CR2, thereby making it difficult to visually recognize the pattern.

Floating wirings may be arranged at corners of the compensation regions CC1, CC2, CR1 and CR2. As a result, widths of the compensation regions CC1, CC2, CR1 and CR2 can be P/2×M (M is an integer), and a degree of freedom in designing the widths thereof is higher than the widths of the column wiring block regions BC1 and BC2 and the row wiring block regions BR1 and BR2.

In the compensation regions CC1 and CC2 (the first compensation regions) belonging to the bundle 20 of wirings in the column direction, the first floating wirings 3F are arranged at all of the portions on the same layer as the detection row wirings 3. At the portions on the same layer as the detection column wirings 2, the detection column wirings 2 are arranged only at places where electrical connection is performed between the detection column wirings 2 in the column wiring block regions adjacent to each other in a diagonal direction, and the second floating wirings 2F are arranged at the other places. In other words, in the compensation regions CC1 and CC2, the detection column wirings 2 are arranged at least at the portions near vertices of the column wiring block regions BC1 and BC2, and the floating wirings are arranged at all of the other portions.

On the other hand, in the compensation regions CR1 and CR2 (the second compensation regions) belonging to the bundle 30 of wirings in the row direction, the second floating wirings 2F are arranged at all of the portions on the same layer as the detection column wirings 2. At the portions on the same layer as the detection row wirings 3, the detection row wirings 3 are arranged only at places where electrical connection is performed between the detection row wirings 3 in the row wiring block regions adjacent to each other in a diagonal direction, and the first floating wirings 3F are arranged at the other places. In other words, in the compensation regions CR1 and CR2, the detection row wirings 3 are arranged at least at the portions near vertices of the row wiring block regions BR1 and BR2, and the floating wirings are arranged at all of the other portions.

As the number of places where the detection column wirings 2 are arranged in the compensation regions CC1 and CC2 and that of places where the detection row wirings 3 are arranged in the compensation regions CR1 and CR2 are smaller, parasitic capacitance between the detection row wirings 3 and the detection row wirings 2 can be reduced. Accordingly, from a viewpoint of improving detection sensitivity of a touch, it is preferable that the places where the detection column wirings 2 are arranged in the compensation regions CC1 and CC2 be only places minimum required for the electrical connection with the detection column wirings 2 in the column wiring block regions adjacent to each other in the diagonal direction, and it is preferable that the places where the detection row wirings 3 are arranged in the compensation regions CR1 and CR2 be only places minimum required for the electrical connection with the detection row wirings 3 in the column wiring block regions adjacent to each other in the diagonal direction. However, since it is possible to detect the touch position even if the number of these places is increased, the number of places may be selected according to the required detection sensitivity of the touch.

Figure 6:
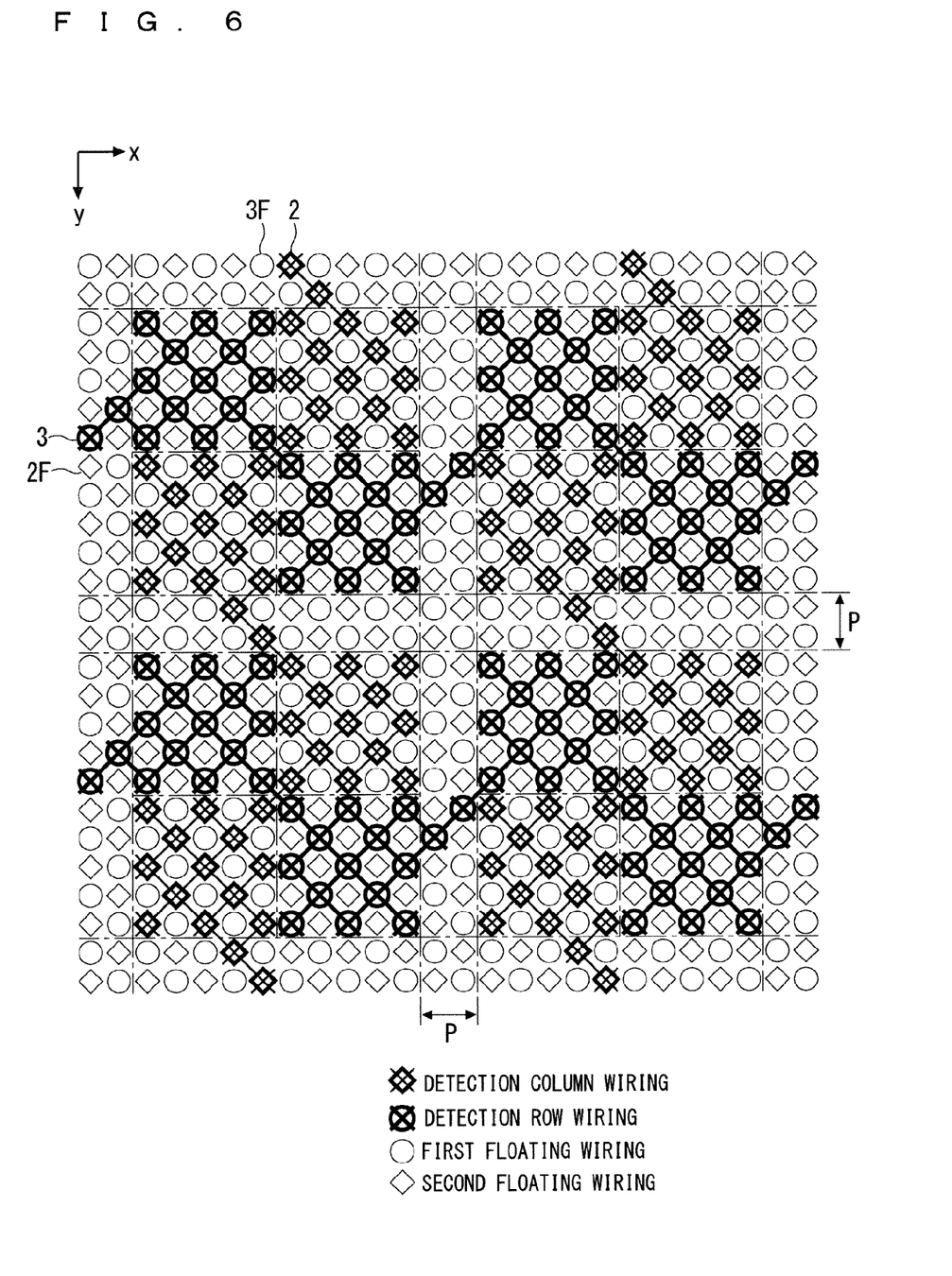
FIG. 6 is a diagram illustrating a configuration of the intersecting region of the bundle of wirings in the column direction and the bundle of wirings in the row direction in the case where a width of a compensation region is P (a pitch of the repetition pattern)

FIG. 6 is a diagram illustrating a configuration of an intersecting region of the bundle 20 of wirings in the column direction and the bundle 30 of wirings in the row direction in the case where a width of the compensation region is P (equal to the pitch of the repetition pattern). In order to simplify the illustration, the detection column wirings 2 are illustrated with rhombuses by thick lines, the detection row wirings 3 are illustrated with circles by thick lines, the first floating wirings 3F on the same layer as the detection row wirings 3 are illustrated with circles by thin lines, and the second floating wirings 2F on the same layer as the detection column wirings 2 are illustrated with rhombuses by thin lines. Further, illustration of a connection pattern between the floating wirings is also omitted.

It is necessary for each compensation region to provide a place for disposing the detection column wiring 2 or the detection row wiring 3, to a minimum, by the number obtained by dividing the width of the compensation region by P/2. As illustrated in FIG. 6, in each compensation region belonging to the bundle 20 of wirings in the column direction, if the detection column wirings 2 are arranged at least at two places, electrical connection can be performed between the detection column wirings 2 in the column wiring block regions arranged in the staggered manner. Further, in each compensation region belonging to the bundle 30 of wirings in the row direction, if the detection row wirings 3 are arranged at least at two places, electrical connection can be performed between the detection row wirings 3 in the row wiring block regions arranged in the staggered manner.

Figure 7:
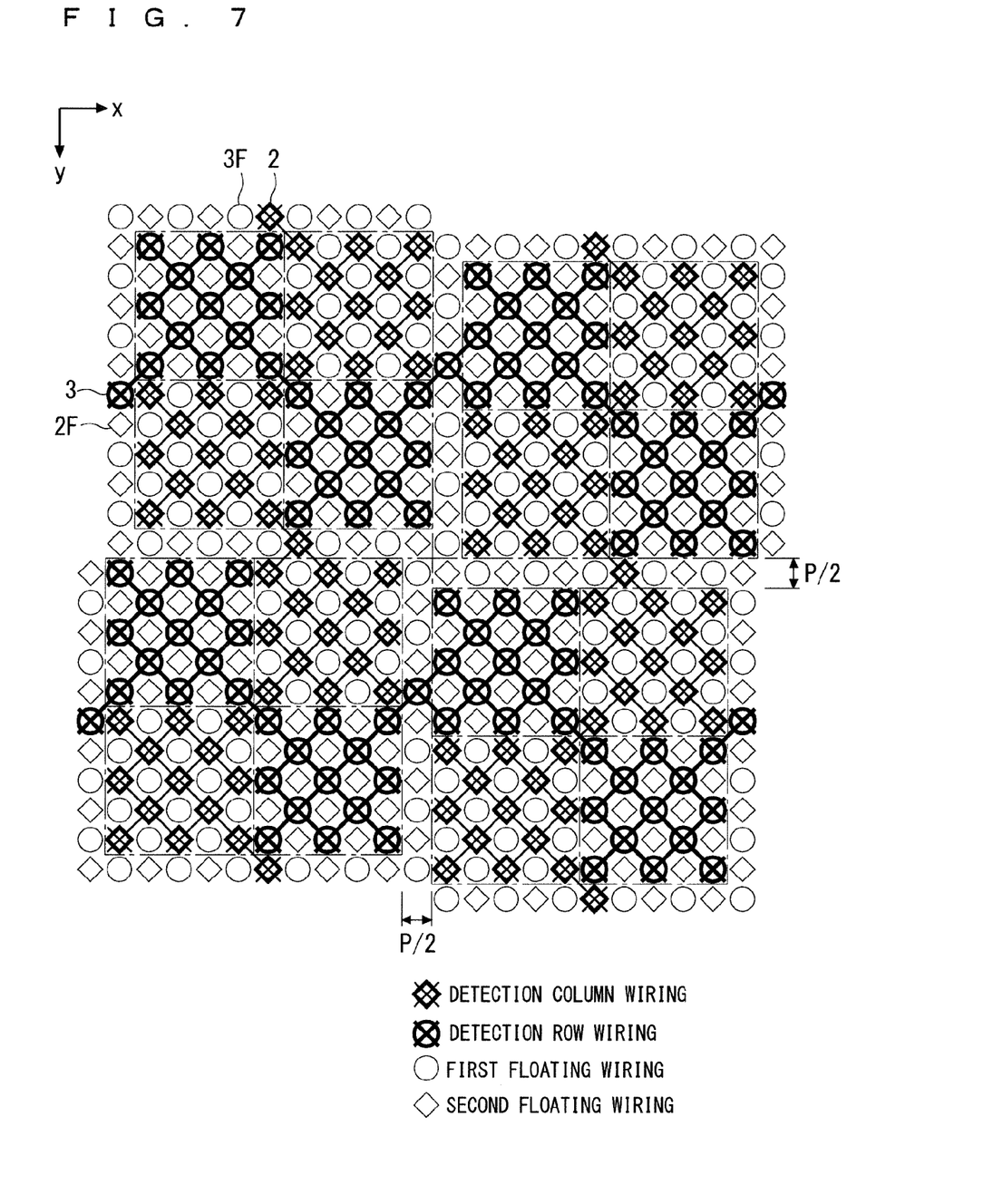
FIG. 7 is a diagram illustrating a configuration of the intersecting region of the bundle of wirings in the column direction and the bundle of wirings in the row direction in the case where the width of the compensation region is P/2 (a half of the pitch of the repetition pattern).

FIG. 7 is a diagram illustrating a configuration of an intersecting region of the bundle 20 of wirings in the column direction and the bundle 30 of wirings in the row direction in the case where the width of the compensation region is P/2 (a half of the pitch of the repetition pattern). As illustrated in FIG. 7, in each compensation region belonging to the bundle 20 of wirings in the column direction, if the detection column wiring 2 is arranged at least at one place, electrical connection can be performed between the detection column wirings 2 in the column wiring block regions arranged in the staggered manner. Further, in each compensation region belonging to the bundle 30 of wirings in the row direction, if the detection column wiring 3 is arranged at least at one place, electrical connection can be performed between the detection row wirings 3 in the row wiring block regions arranged in the staggered manner.

However, as illustrated in FIG. 7, in the case where the width of the compensation region is an odd multiple of P/2, in order to maintain the same repetition pattern at the whole of the bundle 20 of wirings in the column direction and the bundle 30 of wirings in the row direction, it is necessary to shift positions of the column wiring block regions and the row wiring block regions by P/2. In other words, it is necessary to shift the positions of the column wiring block regions adjacent in the column direction by P/2 in the row direction and to shift the positions of the row wiring block regions adjacent in the row direction by P/2 in the column direction.

According to the touch screen 10 having the above-described configuration, since the bundle 20 of wirings in the column direction and the bundle 30 of wirings in the row direction each has the structure including the compensation regions where the widths thereof can be set to P/2×M, a degree of freedom in designing the widths of the bundle 20 of wirings in the column direction and the bundle 30 of wirings in the row direction is improved. Therefore, the size of the sensor region of the touch screen 10 can be adjusted finely, and the size of the sensor region of the touch screen 10 can be adjusted according to the screen size of the display panel.

It should be noted that the configuration of the repetition pattern PC in the column wiring block regions BC1 and BC2 and that of the repetition pattern PR in the row wiring block regions BR1 and BR2 are not limited to those illustrated in FIGS. 5A and 5B, and the configuration may be selected appropriately.

While the invention has been shown and described in detail, the foregoing description is in all aspects illustrative and not restrictive. It is therefore understood that numerous modifications and variations can be devised without departing from the scope of the invention.

What is claimed is:

1. A touch screen comprising:
   a transparent substrate;
   a bundle of wirings in a column direction which is formed on said transparent substrate and includes a plurality of detection column wirings electrically connected in common, and a bundle of wirings in a row direction which includes a plurality of detection row wirings electrically connected in common;
   first floating wirings which are formed on a same wiring layer as said detection row wirings and are not connected with said detection column wirings and said detection row wirings; and
   second floating wirings which are formed on a same wiring layer as said detection column wirings and are not connected with said detection column wirings and said detection row wirings, wherein
   in a region where said bundle of wirings in the column direction and said bundle of wirings in the row direction intersect with each other,
   a column wiring block region arranged with said detection column wirings configuring said bundle of wirings in the column direction and said first floating wirings and a row wiring block region arranged with said detection row wirings configuring said bundle of wirings in the row direction and said second floating wirings are disposed in a staggered manner,
   said bundle of wirings in the column direction includes a first compensation region arranged with said detection column wirings, which are disposed so as to electrically connect between said detection column wirings in said column wiring block regions adjacent to each other in a diagonal direction, said first floating wirings, and said second floating wirings, and
   said bundle of wirings in the row direction includes a second compensation region arranged with said detection row wirings, which are disposed so as to electrically connect between said detection row wirings in said row wiring block regions adjacent to each other in a diagonal direction, said second floating wirings, and said first floating wirings.

2. The touch screen according to claim 1, wherein said detection column wirings in said first compensation region are replaced with said second floating wirings except at places where it is necessary to electrically connect between said detection column wirings in said column wiring block regions adjacent to each other in the diagonal direction, and
   said detection row wirings in said second compensation region are replaced with said first floating wirings except at places where it is necessary to electrically connect between said detection row wirings in said row wiring block regions adjacent to each other in the diagonal direction.

3. The touch screen according to claim 1, wherein said column wiring block region has a rectangular shape where said detection column wirings are arranged at four corners, and
   said row wiring block region has a rectangular shape where said detection row wirings are arranged at four corners.

4. A touch panel comprising:
   the touch screen according to claim 1;
   a switching circuit which sequentially selects each of the plurality of said detection column wirings and each of the plurality of said detection row wirings; and
   a detection processing circuit which, based on detection results of electrostatic capacitance formed between said detection column wiring selected by said switching circuit and a pointing body touching said touch screen and electrostatic capacitance formed between said detection row wiring selected by said switching circuit and said pointing body, calculates a touch position of said pointing body.

5. A display device comprising:

the touch panel according to claim 4; and a display panel, on which said touch screen of said touch panel is mounted.

6. The display device according to claim 5, wherein said touch screen is adhesively fixed to a front surface side of said display panel.

7. A touch panel comprising:

the touch screen according to claim 1;

a switching circuit which sequentially selects each of the plurality of said detection column wirings and each of the plurality of said detection row wirings; and a detection processing circuit which, based on detection results of a change of mutual capacitance between said detection column wiring and said detection row wiring selected by said switching circuit according to a touch of a pointing body to said touch screen, calculates a touch position of said pointing body.

8. A display device comprising:

the touch panel according to claim 7; and a display panel, on which said touch screen of said touch panel is mounted.

9. The display device according to claim 8, wherein said touch screen is adhesively fixed to a front surface side of said display panel.

* * * * *